US006008827A

United States Patent [19]

Fotland

[11] Patent Number: 6,008,827

[45] Date of Patent: Dec. 28, 1999

[54] ELECTROGRAPHIC PRINTING

[76] Inventor: Richard Allen Fotland, 220 Chamberlain St., Holliston, Mass. 01746

[21] Appl. No.: 09/037,905

[22] Filed: Mar. 10, 1998

[51] Int. Cl.$^6$ .................................................... G01D 15/06

[52] U.S. Cl. ............................................ 347/120; 347/112

[58] Field of Search .................................... 347/120, 153, 347/154, 155, 156, 158, 111, 112

[56] References Cited

U.S. PATENT DOCUMENTS

| | | | |
|---|---|---|---|
| 5,093,689 | 3/1992 | Imaeda | 347/154 |
| 5,124,730 | 6/1992 | Lewicki et al. . | |
| 5,126,769 | 6/1992 | Lewicki, Jr. et al. | 347/154 |
| 5,187,501 | 2/1993 | Lewicki et al. . | |
| 5,546,110 | 8/1996 | Lewicki et al. . | |

OTHER PUBLICATIONS

Arthur S. Diamond "Handbook of Imaging Materials" chapter 7 Marcel Dekker, 1991 N.Y, N.Y. (book).

*Primary Examiner*—Huan Tran
*Assistant Examiner*—Lamson D. Nguyen

[57] ABSTRACT

A process for generating a visible image that involves forming an electrostatic latent image upon the surface of a charge receptor medium consisting of a thin dielectric layer adjacent the metallized surface of a non-conducting substrate. The latent image is then developed to form a visible image. The thin dielectric layer may be in the form of a thin plastic film which may be delaminated from the metallized layer after image development and then laminated to the face of graphics display media such as a pressure sensitive paper. Alternately, the dielectric layer may be delaminated from the metallized layer, inverted, and laminated back to the metallized layer so that the developed visible image is sandwiched between the metallized layer and the thin plastic film. The process produces a latent image receptor comprising a support base having a metallized layer and a dielectric layer for use in producing electrographic images.

13 Claims, 2 Drawing Sheets

ELECTROGRAPHIC PRINTING

This invention relates to electrographic printing and, more specifically to a novel process for generating a visible image that involves forming in electrostatic latent image upon the surface of a receptor medium consisting of a thin dielectric image receiving layer in contact with the metallized surface of a thicker non-conducting substrate and then developing the electrostatic latent image.

BACKGROUND OF THE INVENTION

Electrography may be defined as an imaging process in which a latent electrostatic charge image is formed on the surface of dielectric medium and made visible by applying oppositely charged toner particles.

The inventor of the general technology, P. Selenyi, introduced the term "electrography". His classic studies are reported in P. Selenyi "On the Electrographic Recording of Fast Electrical Phenomena", Journal of Applied Physics, Vol. 9, p. 637–641, October, 1938. He describes forming an electrostatic image upon insulating plastic films supported on the surface of a rapidly moving metal surface. Charge was supplied by an image generating charge source mounted above the dielectric film. After charging, the latent charge image was developed and fixed. Selenyi formed images at the incredible recording speed of ten meters per second.

In U.S. Pat. No. 3,714,665, Mutschler et al disclose a recording system using charging styli to deposit a charge on ordinary paper moved in contact over the surface of a metal ground plane.

The use of a charge deposition source to form an electrostatic latent image on the surface of a dielectric film or paper which is moved over the surface of a conducting ground plane is described in U.S. Pat. Nos. 4,463,363 (Gundlach et al), 3,714,665 (Mutschler et al), and 4,521,791 (Day). Moving a relatively thick film or a paper web over a conducting ground plane is easily accomplished because of the high tensile strength of such materials. If, however, a relatively thin film is to be printed in registration using two or more print stations, film stretching and tensile strength considerations limit the effectiveness of this approach. In printing color images, which have large charged areas, the electrostatic tacking forces can be considerable.

Lewicki et al U.S. Pat. Nos. 5,124,730 and 5,187,501 describe a charge deposition printing system employing a plastic film temporarily affixed to the surface of an endless metal belt. In wide format printing, use of an endless metal belt becomes difficult because of problems associated with controlling belt tracking when belt width exceeds belt circumference.

The first commercial applications of electrographic printing employed direct charging of dielectric coated conducting base paper by an array of conducting styli by means of small air gap breakdown. In such processes, the rough paper surface provides an air effective gap spacing and this minimizes air breakdown voltage. Multiplexed driving of such an array of styli is possible since there is a well-defined minimum voltage for initiating electrical breakdown across small air gaps. Multiplexed addressing of writing styli is accomplished by connecting the styli in equal and electrical parallel groups, which are addressed simultaneously, thus significantly reducing the number of high voltage stylus drivers. The stylus groups are positioned adjacent a series of counter-electrodes which either contact a semi-conducting paper base or are capacitively coupled through the image receiving layer to the paper or film base. The counter-electrodes are electrically addressed in such a way as to select the stylus groups in sequence for writing. Each time a stylus group is selected for writing, the digital data for that group is applied to the stylus drivers groups in parallel but only the selected group actually puts latent image charge onto the dielectric receptor. All of the other, non-writing groups have their ability to write suppressed by applying write-suppressing voltage to the counter-electrodes. The net effect of multiplexed stylus driving is to reduce the cost of the drive electronics at the expense of writing speed since many groups must be written in sequence in order to write a single raster line having the length of the entire stylus array. In addition to speed reduction, multiplexed writing introduces a number of deleterious imaging artifacts, discussed below, which degrade the final visible image.

The paper or film base dielectric substrate which supports the dielectric image receiving layer must possess a certain minimum level of resistivity in order to prevent crosstalk between counter-electrodes yet a certain level of conductivity is necessary to enable writing at all. A narrow range of base paper resistivity between about 3 and 10 megohm per square is required of multiplexed, direct charging printers. This limited range of substrate resistivity is difficult to control resulting in imaging defects, described in more detail below. Typical base papers are described in Barr et al U.S. Pat. No. 4,868,048 and Reiche et al U.S. Pat. No. 3,995,083.

Recently introduced direct charging printers do not employ multiplexing since low cost highly integrated high voltage driver switches are now available. These printers may employ base paper having a much higher conductivity. Nevertheless, image defects remain which are associated with use of a resistive paper base. Among these are; image flares due to excess field emission, dropouts due to insufficient field emission, poor and variable dot formation due to charge spreading (blooming) caused by excess field emission, high background from toner stain caused by conductive salts offsetting from back side of the media, field-emission streaks in background areas from "off" styli, a limited variety of directly printable materials due to exacting electrical and mechanical characteristics needed for "contact" latent image creation, limited humidity range, lot-to-lot media variations, media which are difficult to manufacture consistently, printer contamination due to conductive coating which rubs off the back side of the media, printing speed which is limited by base sheet resistivity, and poor sheet aesthetics due to the "chemical" coating on the back side. When multiplexed writing is employed, additional image defects occur which are commonly referred to as "multiplexing striations", speeds are further reduced, and the other imaging defects inherent in all contact writing are considerably exacerbated Early applications of small-gap-breakdown charging of dielectric paper were in the plotter field. Developments over the last several years have seen resolution increased to 16 points per millimeter, printing widths growing to 1.8 meters, and the availability of color.

Electrostatic printing technology was originally developed for text printing and CAD applications. Its advantages of speed, image durability, and good color gamut at moderate cost led to its early dominance in wide-format graphics' applications. The problems listed above, however, are currently causing its market share, in terms of both printer equipment and square footage of output, to erode in favor of simpler, but slower, methods such as ink jet. The total amount of printed output produced using electrostatic printers will continue to increase for the next several years in spite of these problems but, clearly, what is needed is a technology with the advantages of electrostatics but without its drawbacks.

Another method of forming electrostatic latent images employs a gated charge source spaced a tenth of a millimeter or more from the dielectric receptor surface. Here, a charge is formed using a low energy spark, corona wire, or silent electric discharge and the flow of these charges to the recording surface is controlled by fields other than those directly responsible for charge generation.

The silent electric discharge method of latent image charge generation has been commercially successful. This technology has been referred to as; ion printing, charge deposition printing, ion projection printing, and electron beam imaging. Fotland et al U.S. Pat. Nos. 4,155,093 and Carrish 4,160,257 disclose this charge image generation method.

Charge deposition printing provides for very high current density imaging that, in turn, allows one to print electrostatic images at extremely high speeds. Commercial printers presently operate as fast as 2.3 meters per second speed and even higher speeds have been attained in the laboratory. An image element, or dot, may be written in periods as short as 100 nanoseconds. In this case, the time constant of the dielectric receptor media must be less than about 10 nanoseconds. Since the relative dielectric constant of paper is approximately 2, the paper resistivity must be less than 5 megohm-cm. in order to prevent transient voltage drops across the paper base. Such voltage drops have the effect of reducing the extraction electric field of the charge deposition printhead Presently employed dielectric media, and particularly dielectric coated paper, exhibit the many problems listed above when employed with either high speed charge deposition imaging systems or non-multiplexed direct charging apparatus.

SUMMARY OF THE INVENTION

The present invention has been made with the foregoing background in mind.

An object of the present invention is to provide a method of printing that employs a dielectric layer substrate devoid of the above-noted disadvantages and to provide a product prescribed by said method.

Another object of the present invention is to provide a method of printing that employs a substrate having a reduced end user cost.

In addition, according to another aspect of the present invention, there is provided a method of printing that provides great flexibility of output media.

A further object of the present invention is to provide imaging media free of the numerous constraints and imaging defects of currently employed media.

Yet another method of this invention is to provide a method for the very high speed printing of full color images.

A yet further object of this invention is to provide imaging media that permit easy detachment of the visibly imaged layer for reattachment to a wide variety of final substrates.

Another object of this invention is to provide imaging media which permit simple detachment and re-attachment of the visibly imaged layer to the metallized substrate for protection of the colored image by the imaging dielectric layer itself.

It is a feature of the present invention that the novel process employs a dielectric layer substrate which is constructed using either paper or a plastic film metallized with a very thin conducting film. A thin dielectric layer is contiguous with the aforementioned metallized layer. This dielectric layer serves as the latent image receptor. The metallized layer may be formed using vacuum vapor deposition or other means such as sputtering, chemical vapor deposition, or electroless plating methods It is a further feature of this invention to provide a latent image receptor comprising a support base having a metallized layer and a juxtaposed dielectric layer.

A preferred method of manufacturing the metallized substrate involves the use of high vacuum vapor deposition of aluminum onto the surface of paper which has been coated with a polymer layer to form a continuous smooth surface. A smooth surface is provided in order to obtain high optical surface reflectivity as well as to provide a continuous surface for the metallized film. This surface gloss is required since these low cost papers are manufactured for application is decorative labels, gift-wrap paper, and advertising signage. Because these papers are manufactured using wide web processing equipment at very high transport speeds, they are commodity items priced at only a few cents per square foot.

While these papers are currently produced for visual utility, they have, in general, more than adequate conductivity to function as the substrate media of this invention. Indeed, their measured resistivity lies in the range of one to three ohms per square. This electrical conductivity is well above the minimum level required for high quality printing according to the method of this invention.

Another surprising and particularly useful observation is the ease with which plastic films may be hot laminated to the metallized surface and then later separated from the metallized surface (delaminated) without the transfer of metal from the metallized paper to the back of the plastic film.

This discovery not only permits imaged and visually undamaged dielectric films to become available for a wide variety of re-attachment purposes but it enables re-use of the metallized substrate itself.

In one preferred method of this invention, the metallized film or paper dielectric layer substrate is provided with a thin dielectric layer by either laminating with a thin film or by coating the metallized surface with a film forming polymer. This construction is then electrostatically charged to form a latent image, the image is developed, and the toned image fixed to the dielectric surface. Depending upon the final use of the imaged product, the construction may include a pressure sensitive adhesive layer and a release liner, or may consist of plain paper or film.

In another preferred method of this invention, a vacuum metallized paper is laminated, using hot nip rollers, to a thin vinyl transparent film, an electrostatic image is generated on the surface of the vinyl film, the latent image is electrostatically toned, and the vinyl film is delaminated from the paper substrate and hot nip laminated to a receptor layer with the toned image face of the vinyl film in contact with a hot melt adhesive on the surface of the receptor layer. Since the toned image is sandwiched in the film-receptor layer interface, fixing of the image is not required. This now buried image is also protected from weathering, abrasion, and fading in view of the protection afforded by the transparent vinyl film. The receptor layer is typically a pressure sensitive construction useful in mounting the label or signage produced in the manner of this invention. The metallized paper substrate may be either discarded or returned to the supplier to be re-laminated with a new dielectric film for subsequent reuse.

This method of printing large format graphics has the major advantage that the user does not have to inventory large quantities of dielectric-coated pressure sensitive stocks. This large inventory is required because various end users desire the flexibility of pressure sensitive types such as temporary, repositionable, or permanent. Also, a variety of paper weights and textures are required. The complete final media structure does not have to be inventoried since, following the teachings of this preferred method, the imaged thin plastic film may be laminated to any of a wide variety of constructions to form the final imaged product. In addition, the final surface texture of the graphics product may be defined by embossing of the dielectric film during the hot laminating process. This is accomplished by providing the embossing roll with an appropriate surface finish or pattern to provide glossy, matte, or satin finishes to the final image product.

A third method of this invention employs the method described in the above paragraph and includes a process for reusing the metallized film or paper. In this method, a thin plastic film is laminated to the metallized substrate, using nip rollers, immediately prior to the formation of the latent electrostatic image. A supply roll provides the thin plastic film and, after this plastic film is delaminated, the metallized substrate is rewound onto a take-up spool. After the supply roll has been exhausted of metallized support material, the metallized material on the take-up roll is rewound onto the supply roll enabling the reuse of the metallized support material. Another implementation that provides for the reuse of the metallized substrate employs the metallized substrate in the form of a very long endless loop. The metallized substrate comes out of the delaminating nip with substantially zero tension and is randomly stored in a supply bin. Metallized substrate is withdrawn from the supply bin and introduced into the laminating nip. Since the metallized substrate is under zero tension, mechanical edge guiding may be provided to accurately align the substrate web with the thin film web at the laminating nip.

A final preferred method of this invention provides for the sealing, or burying, of the toned image directly to the metallized substrate. This is accomplished by first delaminating the dielectric layer from the metallized substrate. The dielectric layer is next inverted using a turn-bar assembly and the now inverted film is then re-laminated to the metallized substrate using heat and pressure in order to form a permanent bond. A graphic image formed in this manner will have a metallic background as the light transmitted from the transparent film reflects from the metallized film. If a white background is required, the metallized layer must be coated with a very thin white pigmented layer prior to being laminated to the dielectric film. This thin pigmented layer is formulated with a hot melt adhesive to provide the permanent re-lamination bond.

DESCRIPTION OF THE DRAWINGS AND PREFERRED EMBODIMENTS

Figure 1:
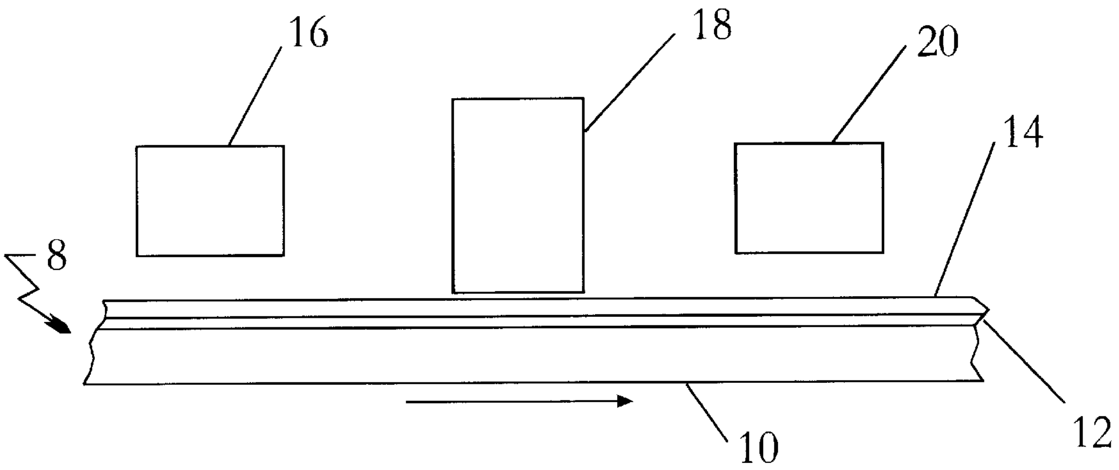
FIG. 1 is a schematic side view showing the printing method of this invention.

FIG. 1 shows a plan view illustrating the method of forming visible images employing imaging media 8 consisting of a dielectric layer 14, metallized layer 12, and a support layer 10. Layer 10 consists of either a paper or a film substrate, which provides the mechanical support for metallized layer 12.

Layer 12 consists of any metallic conductor such as aluminum, chromium, or nickel. This layer may be formed employing any of a variety of manufacturing processes including vacuum vapor deposition, ion sputtering, or electroless plating. The layer 12 is necessary only to provide electrical conductivity and thus its thickness may be as low as about 50 Angstrom units and should not exceed about 50,000 Angstrom units.

Dielectric imaging layer 14 may consist of either a laminated film or a coating of a film-forming polymer. If a white image background is desired, the dielectric imaging layer may be loaded with a white pigment. For a metallic reflecting background, a transparent dielectric layer is employed so that the metallic sheen of the metallized layer is visible through the dielectric layer. The printing method shown in FIG. 1 involves first forming a latent image on layer 12 using charge deposition source 16. Such a charge deposition source is shown and described, for example, in Fotland et al U.S. Pat. Nos. 4,155,093 and Carrish 4,160,257 which description is incorporated herein by reference. One method of employing such a charge deposition print head to form a latent image upon the surface of a wide format dielectric layer involves scanning the print head at high speed across the wide receptor media web. The web may either be advanced between successive scans or the web may be slowly advanced as the scanning head forms the latent electrostatic image. In this manner, advantage is taken of the very high-speed operation capabilities of the latent image forming print head. Since the web moves at a much slower speed than that of the scanning print head, the other process steps, image development and fixing for example, are carried out at the lower speed.

The imaging media 8 moves from left to right and thus the latent image moves under electrostatic development unit 18. Such a development unit is shown and described by Manuchehr Dizechi "Toning Process and Design of Toning Stations for a Single-Pass Color Electrostatic Plotter", Journal of Imaging Technology, Vol. 13, No. 2, p. 68 to 74, April, 1987 which description is incorporated herein by reference. The media next passes under image fixing unit 20, which may, for example, consist of an infrared heat source. Certain liquid toners are self-fixing and the image becomes permanent as the residual liquid developer carrier evaporates from the surface. In this case, the fixing unit is not required.

The dielectric imaging layer 14 must have an electrical resistivity sufficient to hold an electrostatic latent image from the time the image is formed on its surface until the latent image is electrostatically developed.

This lower limit of resistivity may be calculated by noting that the dielectric relaxation time of a layer is equal to the product of the layer's dielectric constant, $K_0$, and its resistivity, r. The dielectric constant is equal to the product of the relative dielectric constant, K, and the permittivity of free space which is equal to 0.0885 picofarads per centimeter. If the required time constant is one second, for example, and the relative dielectric constant is 7; then the minimum resistivity of the layer is equal to 1.6 million megohm-centimeters. This resistivity limitation s independent of layer thickness.

Image blooming effects set a lower limit of capacitance when charging by the preferred method of charge deposition and also by charging pin voltage limitations when forming the latent image via electrical discharge from closely spaced pill electrodes. In either case, the capacitance per unit area should be over 50 picofarads per square centimeter. A preferred capacitance is in the range of 200 to 400 picofarads per square centimeter. In calculating capacitance values, it is necessary to consider the film thickness. The capacitance per unit are may be calculated from the formula:

$$C=0.0885\times K/t \text{ picofarads per square centimeter}$$

Where t is the layer thickness expressed in centimeters.

One preferred imaging layer material is 25 micron thick vinyl film. Vinyl has a relative dielectric constant near 7 and thus the capacitance is equal to 248 picofarads per square centimeter. Vinyl films are useful in this application over the thickness range of about 6 microns to about 50 microns. With few exceptions, plastics and papers have dielectric constants ranging from 2 to 10 and are thus suitable for use in the method of this invention.

Figure 2:
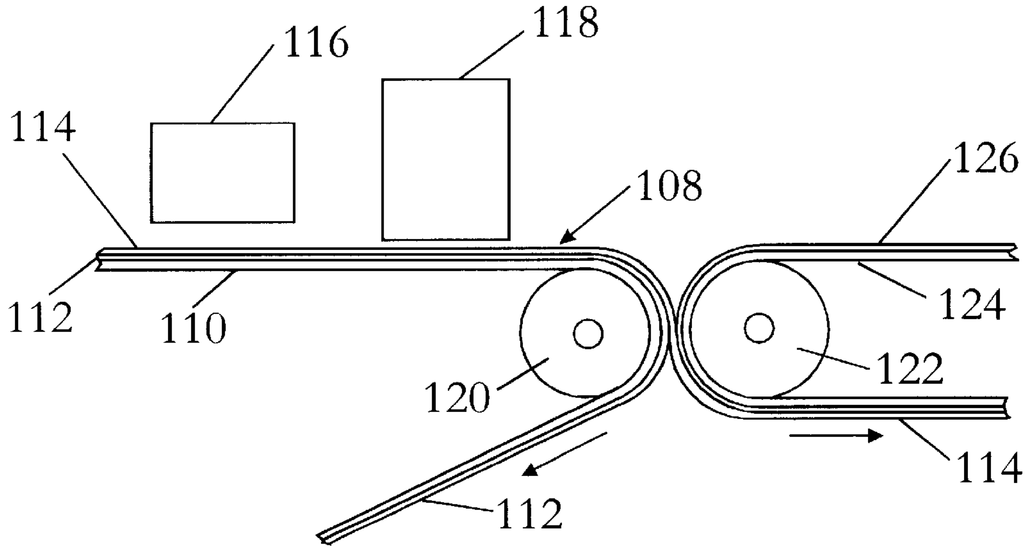
FIG. 2 is a schematic view showing the method of transferring the imaged film from the metallized carrier substrate to the receptor layer.

FIG. 2 shows a method of using the laminated metallized media 108 in a system where the developed image is sandwiched between a laminate formed of the imaging film 114 and a display media substrate 124. Rollers 120 and 122 form a nip for the transfer of the imaging film 114 onto the surface of the media substrate 124. The metallized layer 112 remains bonded to the support layer 110 during and after transfer. A hot melt adhesive 126 coated on the surface of media substrate 124 may be activated by heating rollers 120 and 122.

The display media substrate 124 may be plain paper, with or without a hot melt adhesive coating 126. If an adhesive coating is not present on substrate 124, then such a coating is needed on the surface of film 114 that is to be bonded to layer 124. The adhesive coating is not required to be of the hot-melt type. Viable alternates to adhesive coating include pressure sensitive coatings as well as water activated or heat set adhesives.

Media substrate 124 may, alternatively, consist of a pressure sensitive paper or film face stock laminated with a release liner. Another option involves the choice of pressure sensitive material. These include removable, repositionable, and permanent adhesives; each of which are useful in image media mounting applications. It is a singular advantage of this invention that an almost unlimited number of image mounting and display options are possible.

The support layer 110 and its metallized layer 112 may be discarded after use. Availability of low cost metallized paper provides the economic feasibility of this method. It is also possible to reuse the metallized support layer by laminating a new dielectric imaging film onto the surface of the metallized layer. Lamination may he carried out by either returning the rolled metallized support layer to the supplier or by having the user laminate a new imaging layer at his printing site. In applications involving re-use of the metallized support layer 110, more costly and much more durable support layers such as film may be used.

As previously mentioned, the ability to employ a single imaging substrate together with a wide variety of media substrates provides great flexibility for the end user in terms of providing a wide range of service products while maintaining a relatively small inventory of media.

Figure 3:
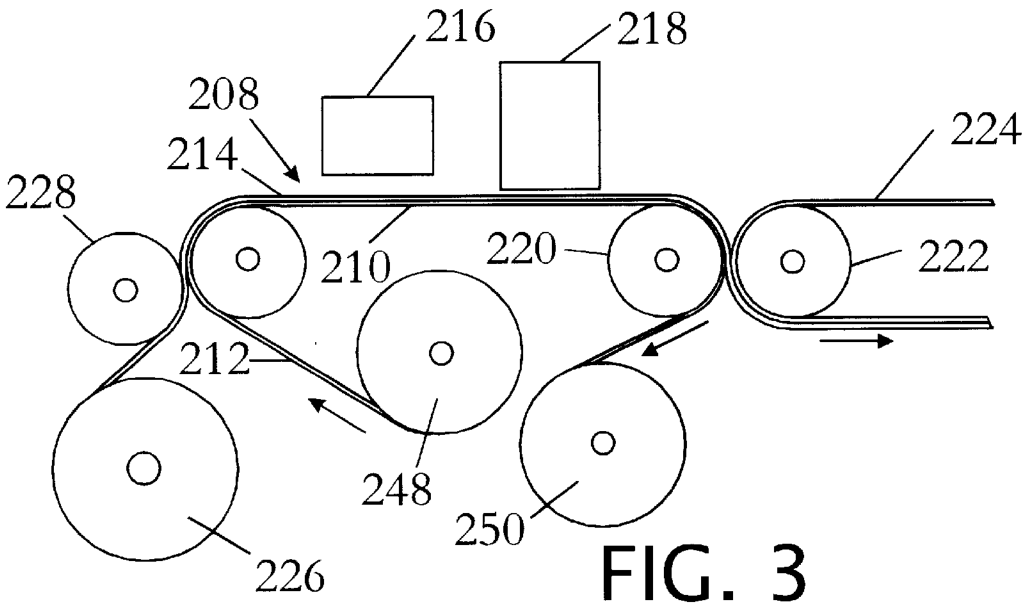
FIG. 3 shows a schematic view illustrating the method of temporarily laminating the imaging film to the metallized carrier substrate.

Another method, shown in FIG. 3, employs the metallized support layer 212 in the form of a continuous web. The dielectric imaging film 214 is laminated to the metallized support carrier 212 to form an imaging media 208 prior to the printing operation. In this figure, the metallized layer 212 is not shown separate from layer and thus 212 consists of either a film or paper substrate having a thin metallized support layer (such as 110 in FIG. 2) on its surface. The dielectric film is unwound from supply roll 226, and temporarily laminated to metallized support carrier 212 using lay-on roll 228. The metallized support layer is provided from supply roll 248. After being employed as a carrier and conducting ground plane in the imaging step, the support layer is rewound on take-up roll 250. Imaging unit 216, toning or latent image development unit 218, and transfer of the imaged dielectric film 214 to a media substrate 224 using laminating rolls 220 and 222 are all as in the example describing FIG. 2. After all of the available metallized support material has been used in carrying out the imaging process, the metallized support 212 may be rewound from take-up spool 250 to supply spool 248 and reused. This process may be repeated until the metallized carrier becomes damaged from use.

An alternate method providing for reuse of the metallized support replaces the unwind and rewind rolls 248 and 250 with a large random loop storage bin. Metallized support stored as a random loop in the storage bin is withdrawn and laminated with the dielectric film using lay-on roll 228. Since the web is supplied under zero tension, edge guides may be employed to properly align the metallized carrier to the dielectric film. Metallized support is ejected from the transfer nip formed by roll 220 and 222 and introduced into a slot in the random storage bin. Free ends of the metallized support may be taped together to form a very large endless loop. A splice detector prevents unwanted imaging on the section of the loop containing the splice.

Figure 4:
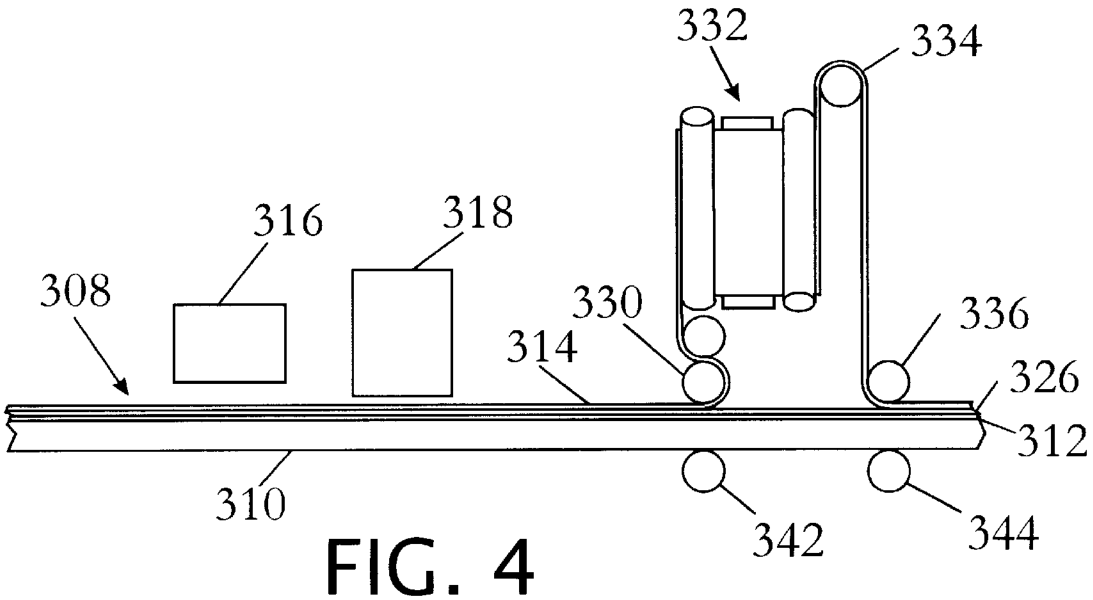
FIG. 4 is schematic view showing the method of delaminating, inverting, and re-laminating the imaged dielectric film to the metallized carrier substrate in order to provide protection of the toned visual image.

FIG. 4 illustrates a method of providing a final graphic product wherein the colored image material becomes buried within the media laminate. This process is carried out using imaging media 308 comprised of support base 310 having metallized layer 312, white pigmented adhesive coating 326 and clear dielectric film 314 temporarily laminated to the adhesive layer.

The media is exposed, toned, and fixed (if required) as in the example of FIG. 1. Thus, the imaging unit 316 forms an image on the metallized layer 312, which is then developed under development unit 318. After development, the dielectric film 314 is delaminated from the white pigmented hot-melt coating 326. The film is then inverted using the turn-bar three roll assembly 332. The image side of the film is now laminated to the white pigmented layer 326 and, thus, the final product consists of a sandwiched image protected from environmental degradation. The white pigmented layer may be formed of a hot melt adhesive or, alternately, of a pressure sensitive adhesive. In order to promote release of the dielectric film from a pressure sensitive adhesive, the surface of the dielectric film originally contiguous with the pressure sensitive adhesive may be treated or coated so as to possess a low energy surface. Thus, the de-lamination peel strength will be lowered to facilitate removal of the thin film after imaging and toning. Alternately, the hot melt adhesive may be coated on the top surface of the dielectric film. The hot melt surface then receives the developed image and, after inverting the dielectric film, serves to form the film-receptor sheet bond.

Assembly 332, the three roll turn-bar assembly, is well-known and widely used in conventional printing presses to invert a web for the purpose of printing both sides of a paper web. The two outer rollers are canted at a 45 degree angle and serve to change the travel direction of the web. Since the web has to move laterally over the roll face, these canted rolls are usually non-rotating and are provided with numerous holes over the surface of the roll. Compressed air blown through these holes forms an air bearing layer which allows this transverse motion. The center roll is a simple idler.

Delaminating nip rollers 330 and 342 are driven in order to provide low web tension in the turn-bar assembly region. The air bearings require that the web tension be relatively low in order that web tension forces not overcome the air bearing lift forces.

Idler roll 334 operates as a dancer roll. This roll is thus free to translate in a vertical direction. The upward loading force establishes low web tension in the region between the delaminating nip formed by roller 330 and 342 are laminating nip formed by rollers 336 and 344. Translation motion also compensates for expansion differentials between the dielectric film and the metallized support layer in the region between the nips.

While the configurations shown in this specification only employ a single color printing station, it is understood that two, four, or even six or more color stations may be cascaded to provide for multi-color graphic printing.

The invention is further illustrated in the following non-limiting examples.

EXAMPLE 1

Gift-wrap grade vacuum metallized (aluminized) type A141 (non-print treated) paper is sold by Van Leer Metallized Products Inc., Franklin, Mass. The A141 paper has a thickness of about 75 microns and may be coated with an 8-micron dry thickness styrene-acrylic copolymer using a wire-wound rod. The coating would preferably be formulated to have a 1.5 to 1 ratio of calcium carbonate pigment to binder. After drying, an electrostatic image may be formed on the insulating copolymer surface using a negative corona wire and a stainless steel mask positioned in contact with the copolymer surface. The latent image so formed may be toned using tray development with a standard electrostatic-plotter liquid toner consisting of black pigment and resin dispersed in an paraffinic solvent carrier. Dense high quality images may thus be obtained. Similar results can be obtained when the Van Leer A141 non-print treated paper is replaced with a Van Leer A141 print-treated paper. The A141 print-treated paper is supplied with a very thin bonding coating to promote adhesion of printing inks to the paper.

EXAMPLE 2

Imaging media laminates were prepared by hot-roll laminating 25-centimeter square sheets of thin transparent plastic films to A141 vacuum metallized papers manufactured by the Van Leer Metallized Products Company. Films of polyethylene having a thickness of about 12 microns, vinyl films having a thickness of about 20 microns, and fluoropolymer films about 25 microns in thickness were each successfully laminated to the A141 metallized layer at nip temperatures in the 100 to 150 degree Celsius range. After cooling to room temperature, all three materials formed a temporary bond to the metallized surface. The peel strength of the bond thus formed was approximately 40 gram per centimeter. At temperatures over 160 to 180 degrees Celsius, the metallized film was disrupted by partial adhesion to the films after separation. The print primed A141 exhibited only slightly higher peel strengths and the maximum nip temperatures before metallized layer disruption was 120 degrees Celsius. Each of the six media samples formed by lamination could be electrostatically imaged and toned using the method described in example 1.

After toning, these plastic films were delaminated from the metallized carrier and then laminated to a hot melt adhesive coated paper base using a combination of heat and pressure. The lamination was carried out so that the imaged side of the film was facing the hot melt adhesive. During this lamination process, image integrity was preserved in all six cases.

EXAMPLE 3

Van Leer A141 print-treated metallized paper may be coated with a 8-micron thick white pigmented hot-melt coating. The coating can be formulated of 50 parts linear polyethylene (molecular weight 500), 40 parts isocyanate-modified microcrystalline wax, and 40 parts calcium carbonate pigment. A vinyl film could be laminated to A141 metallized and coated paper under pressure at room temperature. This construction could then imaged and toned as described in example 1.

The imaged vinyl film could next be delaminated from the hot-melt coating and the film reversed so that the image side now faces the hot-melt layer and this new configuration laminated using a hot press set to a temperature of 90 degrees Celsius. The toned image would now be sandwiched between the vinyl film and the hot-melt coating and thus protected from environmental damage.

Although the invention has been described herein with reference to specific embodiments, many modifications and variations therein will readily occur to those skilled in the art. Accordingly, all such variations and modifications are included within the intended scope of the invention.

What is claimed is:

1. A process for generating a visible image in an electrographic imaging system consisting of providing a non-conducting substrate having a metallized layer adjacent thereto, associating a thin dielectric layer comprised of a thin plastic film with said metallized layer, forming an electrostatic latent image upon the surface of the thin dielectric layer, developing the electrostatic latent image to form a visible image, delaminating said thin plastic film from said metallized layer foil, and then laminating said thin plastic film containing the visible image to a display media substrate so that the developed image side of the film is contiguous with said display media substrate.

2. The process of claim 1 including the step of laminating the thin dielectric layer to the metallized layer prior to the step of forming an electrostatic latent image upon the surface of said thin dielectric layer.

3. The process of claim 2 wherein the metallized layer is in the form of an endless loop that has substantially zero tension in the region where said metallized layer is not laminated to said thin film.

4. The process of claim 1 wherein the metallized layer adjacent to said substrate is first coated with a thin hot melt adhesive layer, following which a thin plastic film is temporarily laminated to the adhesive layer so that the plastic film may be imaged and toned, following which said plastic film is delaminated from said thin hot melt coating and the delaminated film is inverted and permanently laminated to said thin hot melt coating, whereby the toned image is sandwiched between said hot melt coating and said thin plastic film.

5. The process of claim 1 including the steps of first coating said metallized layer with a thin pressure sensitive adhesive layer, then laminating a thin plastic film having a low energy surface to the adhesive layer, whereby the low energy surface of said thin plastic film is contiguous with said pressure sensitive adhesive, then imaging and toning said plastic film, then delaminating the film from said thin hot melt coating, then inverting said plastic film and finally permanently laminating the film to said pressure sensitive adhesive, whereby the toned image is sandwiched between said hot melt coating and said thin plastic film.

6. The process of claim 1 wherein said laminating process employs a patterned embossing roll whereby the surface texture of the final laminated display media may be controlled by controlling the surface texture of said embossing roll.

7. An electrostatic imaging medium comprising a support base having a conducting metallized layer and a dielectric layer contiguous to said conducting metallized layer, said dielectric layer comprising a white pigmented plastic resin.

8. The electrostatic imaging medium of claim 7 wherein instead of said white pigmented plastic resin said dielectric layer is comprised of a transparent plastic film having a thickness in the range between about 5 microns to about 250 microns.

9. The electrostatic imaging medium of claim 8 including a pressure sensitive layer sandwiched between said dielectric layer and said metallized layer.

10. The electrostatic imaging medium of claim 8 including a hot-melt adhesive layer sandwiched between said metallized layer and said dielectric layer.

11. The electrostatic imaging medium of claim 9 wherein said dielectric layer possesses a low energy release surface on the layer side contiguous with said pressure sensitive layer.

12. The electrostatic imaging medium of claim 8 wherein the outer surface of the dielectric layer is provided with a thin hot-melt coating.

13. Electrographic imaging apparatus comprising in combination:

charge receptor means consisting of a non-conducting substrate, a metallized layer adjacent said non-conducting substrate, and a thin dielectric layer adjacent said metallized layer, a charge image deposition printhead located to be adjacent said charge receptor means and being capable of forming an electrostatic latent image upon the surface of said thin dielectric layer;

means for developing said latent electrostatic image to form a visible counterpart; and means for protecting said visible counterpart, comprising means for delaminating said thin dielectric layer from said metallized film and means for relaminating said thin dielectric layer to a receptor layer, whereby the developed image is sandwiched between said dielectric layer and said receptor layer.

* * * * *